United States Patent
Getschow

(10) Patent No.: US 10,905,264 B1
(45) Date of Patent: Feb. 2, 2021

(54) BED SHEET WITH ANTI-SLIP STRIP

(71) Applicant: Ronald Getschow, Delray Beach, FL (US)

(72) Inventor: Ronald Getschow, Delray Beach, FL (US)

( * ) Notice: Subject to any disclaimer, the term of this patent is extended or adjusted under 35 U.S.C. 154(b) by 91 days.

(21) Appl. No.: 16/208,698

(22) Filed: Dec. 4, 2018

(51) Int. Cl.
*A47G 9/02* (2006.01)
*A47C 31/10* (2006.01)
*A47G 9/04* (2006.01)
*A61G 7/015* (2006.01)

(52) U.S. Cl.
CPC .............. *A47G 9/04* (2013.01); *A47C 31/105* (2013.01); *A47G 9/0238* (2013.01); *A47G 9/0246* (2013.01); *A61G 7/015* (2013.01); *B32B 2307/744* (2013.01)

(58) Field of Classification Search
CPC ...... A47G 9/0246; A47G 9/0238; A47G 9/02; A47G 9/0207; A47G 9/0223; A47C 31/105
USPC .................... 5/497, 495, 482, 486, 925, 926
See application file for complete search history.

(56) References Cited

U.S. PATENT DOCUMENTS

| | | | |
|---|---|---|---|
| 1,151,894 A | 8/1915 | Meinecke | |
| 3,474,781 A | 10/1969 | Gaylord, Jr. | |
| 3,829,914 A * | 8/1974 | Treat | A47C 21/00 5/81.1 T |
| 5,177,821 A * | 1/1993 | Kawtoski | A47G 9/0246 5/482 |
| 5,329,655 A * | 7/1994 | Garner | A61G 7/1026 5/502 |
| 5,701,617 A | 12/1997 | Colby | |
| 5,787,523 A * | 8/1998 | Lindberg | A47G 9/0238 5/81.1 HS |
| 6,732,389 B2 * | 5/2004 | Drexler | A47G 9/0238 5/482 |
| 6,874,180 B2 * | 4/2005 | Liao | A47C 15/008 5/482 |
| 7,152,259 B1 | 12/2006 | Goodwin | |
| 7,165,277 B2 | 1/2007 | Taguchi | |
| 7,240,384 B2 | 7/2007 | Dudonis | |
| 8,332,976 B1 | 12/2012 | Goldwater | |
| 2003/0221257 A1 * | 12/2003 | Drexler | A47G 9/0238 5/486 |
| 2004/0013853 A1 | 1/2004 | Mandzsu | |
| 2004/0117909 A1 * | 6/2004 | Liao | A47G 9/0246 5/482 |

FOREIGN PATENT DOCUMENTS

WO        2002042068        5/2002

* cited by examiner

*Primary Examiner* — Robert G Santos

(57) ABSTRACT

The bed sheet with anti-slip strip is configured for use with a reclining bed. The reclining bed is further with a mattress. The mattress is a cushion on which a patient rests. The patient refers to an individual using the invention. The reclining bed forms an adjustable cant between a plane parallel to a supporting surface and a portion of the mattress. The cant formed by the reclining bed is adjustable. The bed sheet with anti-slip strip comprises the reclining bed, a fitted sheet, and a friction strip. The fitted sheet is a sheet used to cover the mattress. The friction strip is a structure that prevents the patient from shifting position relative to the mattress when the patient rests on the fitted sheet.

12 Claims, 5 Drawing Sheets

BED SHEET WITH ANTI-SLIP STRIP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including household equipment, more specifically, fitted sheets for use a bed linen. (A47G9/0246)

SUMMARY OF INVENTION

The bed sheet with anti-slip strip is configured for use with a reclining bed. The reclining bed is further with a mattress. The mattress is a cushion on which a patient rests. The reclining bed forms an adjustable cant between a plane parallel to a supporting surface and a portion of the mattress. The cant formed by the reclining bed is adjustable. The bed sheet with anti-slip strip comprises the reclining bed, a fitted sheet, and a friction strip. The fitted sheet is a sheet used to cover the mattress. The friction strip is a structure that prevents the patient from shifting position relative to the mattress when the patient rests on the fitted sheet.

These together with additional objects, features and advantages of the bed sheet with anti-slip strip will be readily apparent to those of ordinary skill in the art upon reading the following detailed description of the presently preferred, but nonetheless illustrative, embodiments when taken in conjunction with the accompanying drawings.

In this respect, before explaining the current embodiments of the bed sheet with anti-slip strip in detail, it is to be understood that the bed sheet with anti-slip strip is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bed sheet with anti-slip strip.

It is therefore important that the claims be regarded as including such equivalent construction insofar as they do not depart from the spirit and scope of the bed sheet with anti-slip strip. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
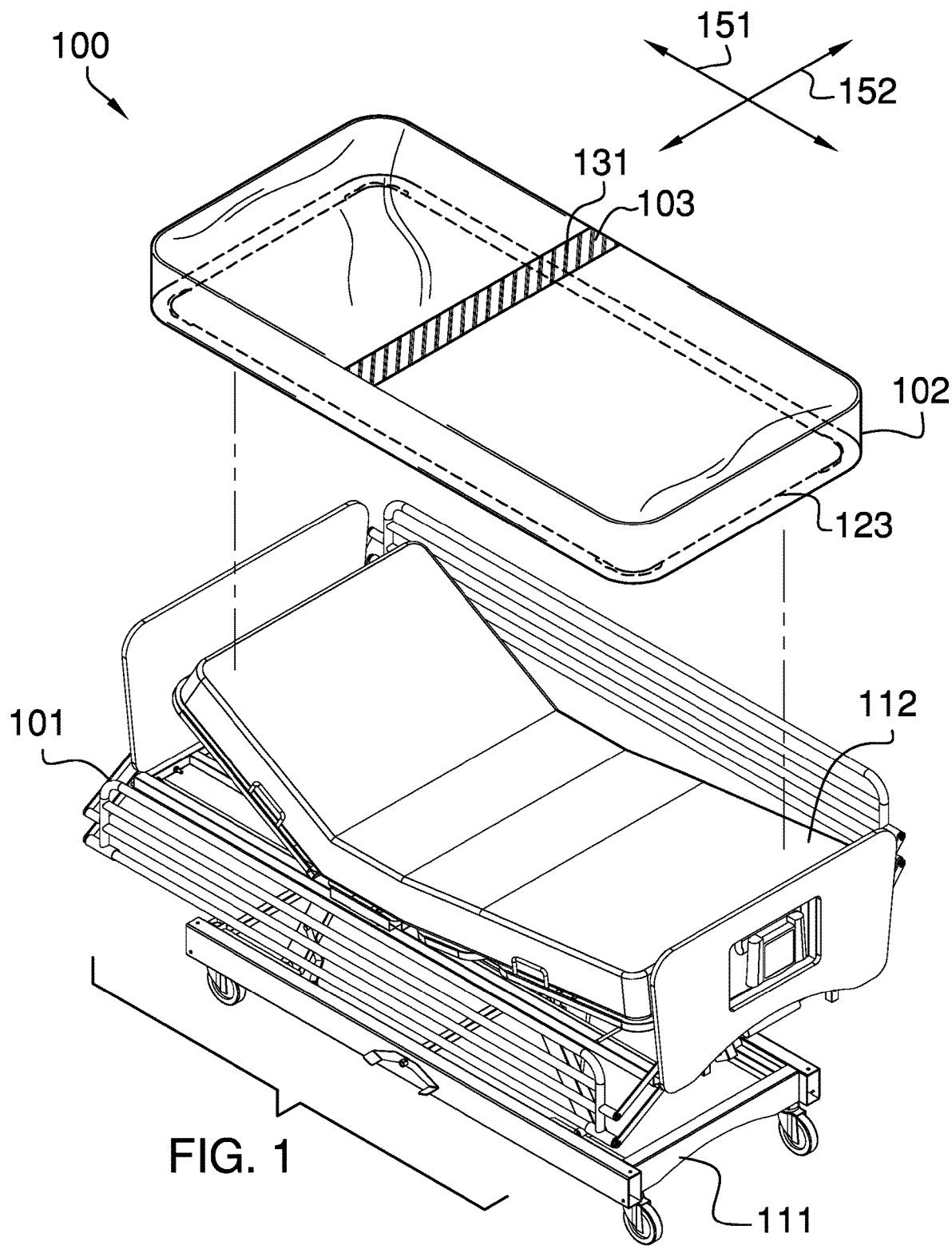
FIG. 1 is a perspective view of an embodiment of the disclosure.
Figure 2:
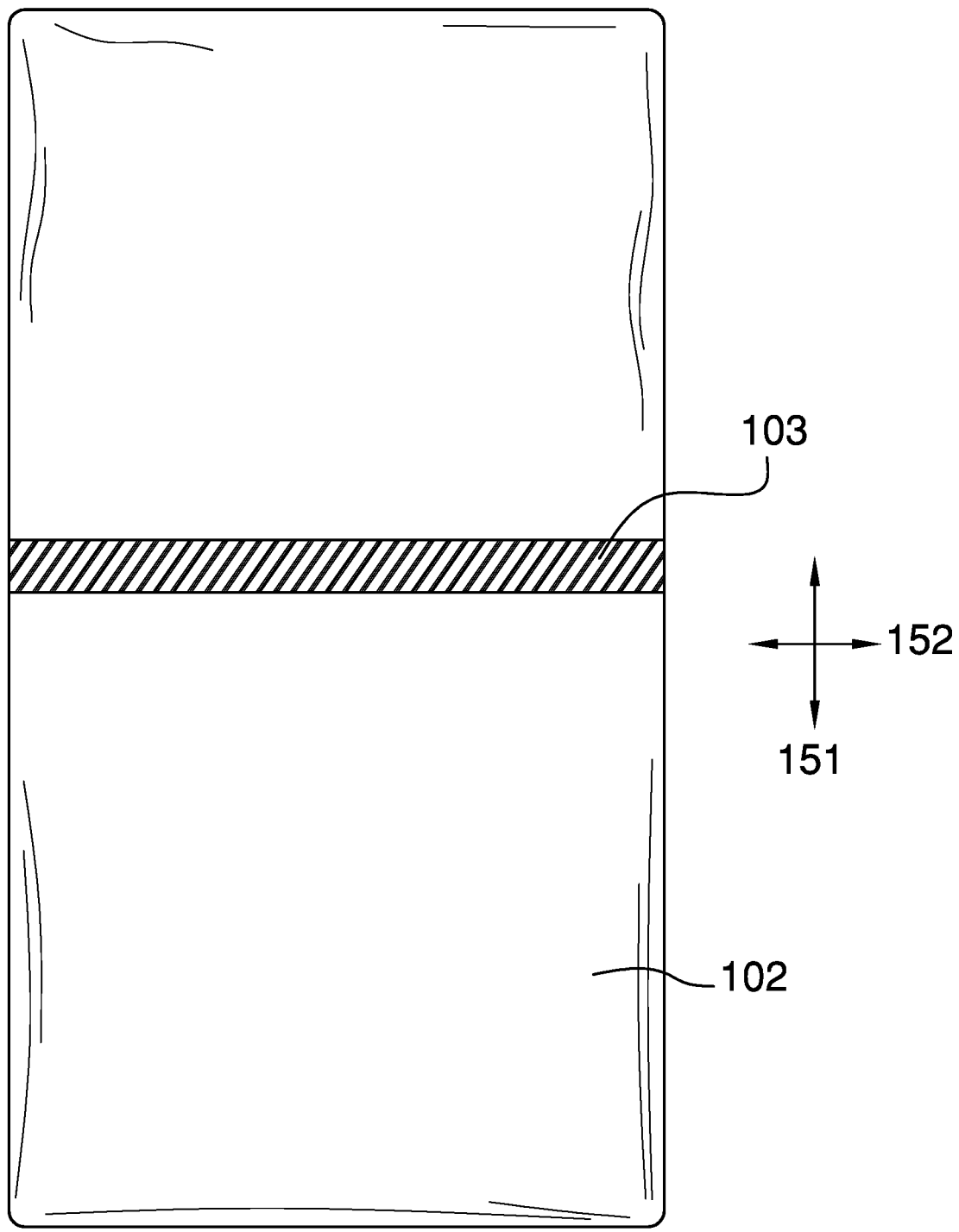
FIG. 2 is a top view of an embodiment of the disclosure.
Figure 3:
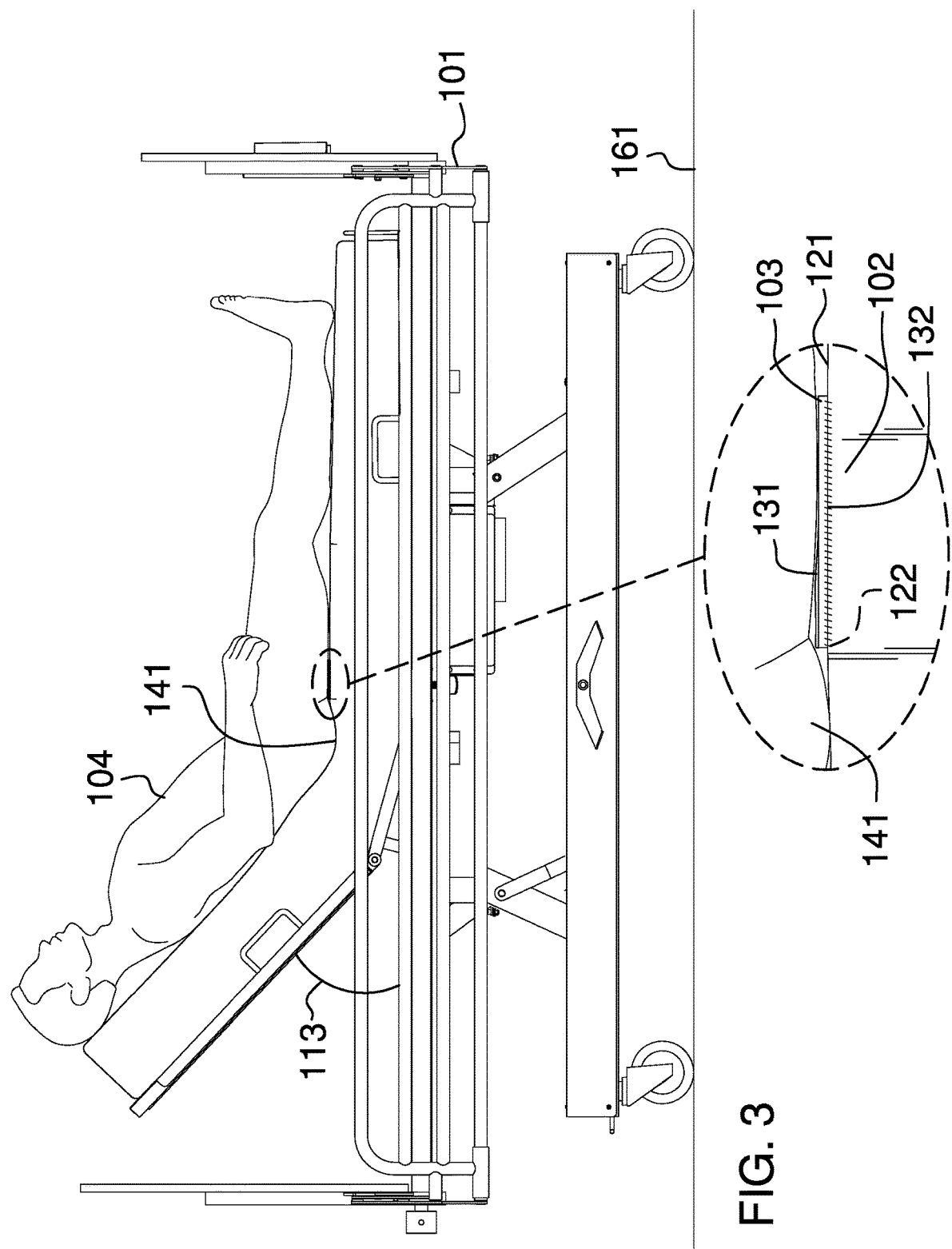
FIG. 3 is an in-use view of an embodiment of the disclosure.
Figure 4:
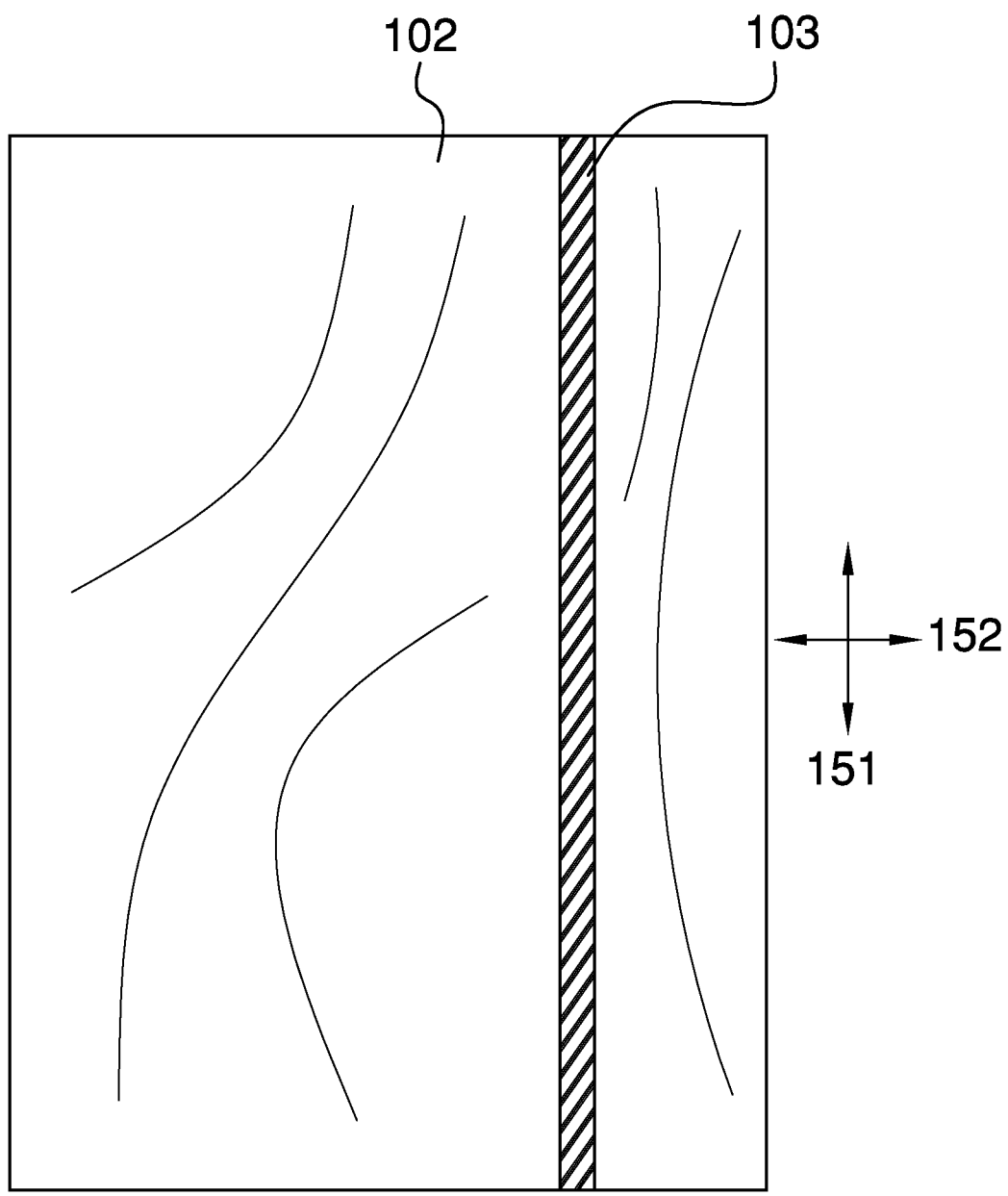
FIG. 4 is a top view of an alternate embodiment of the disclosure.
Figure 5:
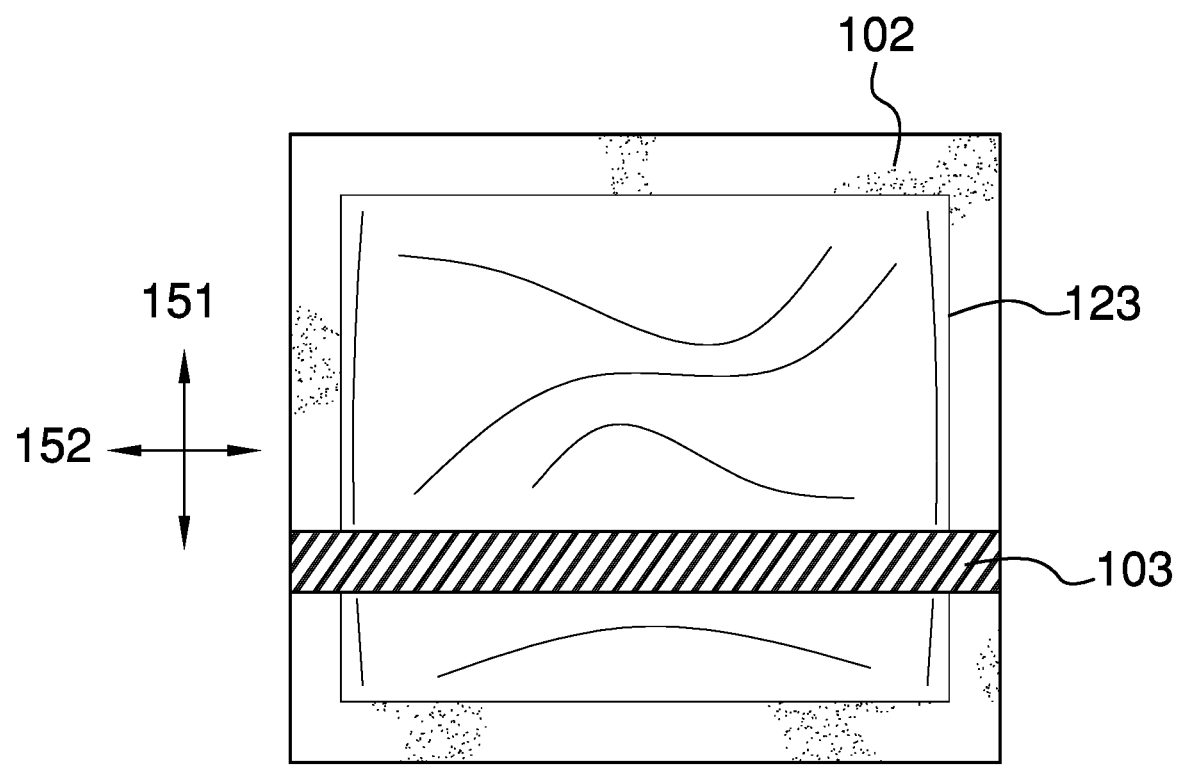
FIG. 5 is a top view of an alternate embodiment of the disclosure.

Detailed reference will now be made to one or more potential embodiments of the disclosure, which are illustrated in FIGS. 1 through 5.

The bed sheet with anti-slip strip is configured for use with a reclining bed 101. The reclining bed 101 further comprises a mattress 112. The mattress 112 is a cushion on which a patient 104 rests. The reclining bed 101 forms an adjustable cant 113 between a plane parallel to a supporting surface 161 and a portion of the mattress 112. The cant 113 formed by the reclining bed 101 is adjustable. The invention comprises the reclining bed 101, a fitted sheet 102, and a friction strip 103. The fitted sheet 102 is a sheet used to cover the mattress 112. The friction strip 103 is a structure that prevents the patient 104 from shifting position relative to the mattress 112 when the patient 104 rests on the fitted sheet 102. The supporting surface 161 is defined in greater detail elsewhere in this disclosure.

The reclining bed 101 is a furniture item. The reclining bed 101 forms a surface that supports a patient 104 at an elevation above a supporting surface 161. The reclining bed 101 is an adjustable structure such that the cant 113 between the surface supporting the patient 104 and a plane parallel to the supporting surface 161 is adjustable. The reclining bed 101 is a well-known and documented structure. The reclining bed 101 is further defined with a cant 113.

The reclining bed 101 comprises a frame 111 and a mattress 112. The mattress 112 is further defined with a length direction 151 and a width direction 152.

The frame 111 is a mechanical structure. The frame 111 creates an elevated surface that supports the patient 104 and the mattress 112 at an elevation above the supporting surface 161. The frame 111 forms a load path that transfers the load of the patient 104 and the mattress 112 to the supporting surface 161. The frame 111 is an adjustable structure. The construction of the frame 111 is such that the cant 113 of the elevated surface of the frame 111 is adjustable. The construction of the frame 111 is such that the cant 113 of a segment of the elevated surface of the frame 111 is adjustable. The segment is selected from the group consisting of: a) the entire elevated surface formed by the frame 111; and, b) a portion of the elevated surface formed by the frame 111. The use of a frame 111 for the purposes described in this disclosure are well-known and documented in the furniture arts.

The mattress 112 is a cushion that rests on the elevated surface formed by the frame 111. The mattress 112 is a rectangular block structure. The patient 104 rests on the mattress 112. The mattress 112 is a well-known and documented structure. The length direction 151 refers to the major axis of the rectangular block that forms the mattress 112 when the mattress 112 lays horizontally flat. The width direction 152 refers to the minor axis of the rectangular block that forms the mattress 112 that is parallel to the horizontal axis when the mattress 112 lays horizontally flat.

The cant 113 refers to the angle that is formed between the inferior surface of the mattress 112 and a plane that is parallel to the supporting surface 161 for the invention 100. The cant 113 is adjustable. The adjustable nature of the cant 113 allows the invention 100 to be customized to meet the comfort needs of the patient 104.

The fitted sheet 102 is a sheeting. The fitted sheet 102 is formed from a textile. The fitted sheet 102 encloses the mattress 112 of the reclining bed 101. The fitted sheet 102 forms a structure such that the fitted sheet 102 attaches itself to the mattress 112 without having to fold the sheeting structure of the fitted sheet 102. The form factor of the fitted sheet 102 is selected to match the form factor of the mattress 112. The fitted sheet 102 is a well-known and documented structure. The fitted sheet 102 comprises an exterior surface 121, an interior surface 122, and a perimeter 123.

The exterior surface 121 is the surface of the fitted sheet 102 that is distal from the mattress 112 when the fitted sheet 102 is placed on the mattress 112. The friction strip 103 attaches to the exterior surface 121 of the fitted sheet 102. The interior surface 122 is the surface of the fitted sheet 102 that is proximal to the mattress 112 when the fitted sheet 102 is placed on the mattress 112. The interior surface 122 is distal from the exterior surface 121. The perimeter 123 refers to the outer boundary of the sheeting that forms the fitted sheet 102.

The friction strip 103 is a mechanical structure that attaches to the exterior surface 121 of the fitted sheet 102. The friction strip 103 forms a high friction surface on the exterior surface 121 of the fitted sheet 102. In the first potential embodiment of the disclosure, the friction strip 103 is a webbing. The friction strip 103 could be sprayed or painted on in lieu of a piece of webbing. The buttocks 141 of the patient 104 rest on the friction strip 103 such that the friction strip 103 holds the patient 104 independently of the cant 113 formed by the reclining bed 101. The buttocks 141 are defined in greater detail elsewhere in this disclosure. The friction strip 103 further comprises a friction coating 131 and a seam 132.

The friction coating 131 is an elastomeric coating applied to the webbing that forms the friction strip 103. The friction coating 131 forms the high friction surface that prevents the patient 104 from slipping while resting on the reclining bed 101. The seam 132 is a structure that attaches the friction strip 103 to the exterior surface 121 of the fitted sheet 102.

In the first potential embodiment of the disclosure, the friction strip 103 is applied to the fitted sheet 102 such that the friction strip 103 is parallel to the width direction 152 of the fitted sheet 102. In a second potential embodiment of the disclosure, the friction strip 103 is applied to the fitted sheet 102 such that the friction strip 103 is parallel to the length direction 151 of the fitted sheet 102.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Buttock: As used in this disclosure, the buttock refers to one of two rounded portions of the rump that: 1) in combination form the inferior region of the torso; and, 2) individually forms the superior region of a leg in a bi-pedal creature or the rear leg of a multi-legged creature. The buttock is often referred informally as the "butt."

Cant: As used in this disclosure, a cant is an angular deviation from one or more reference lines (or planes) such as a vertical line (or plane) or a horizontal line (or plane).

Coating: As used in this disclosure, a coating refers to a substance that is applied to the exterior surface of an object such that the coating forms a new exterior surface of the object. A coating is commonly said to be formed as a layer. Paint is an example of a common coating material.

Cushion: As used in this disclosure a cushion is a pad or pillow formed from a soft material that is used for resting, sleeping, or reclining.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Form Factor: As used in this disclosure, the term form factor refers to the size and shape of an object.

Friction: As used in this disclosure, friction refers to a force that occurs between two objects that are in motion while in contact with each other. The force resists the relative motion of the two objects.

Interior: As used in this disclosure, the interior is used as a relational term that implies that an object is contained within the boundary of a structure or a space.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Patient: As used in this disclosure, a patient is a person who is designated to receive a medical treatment, therapy or service. The term patient may be extended to an animal when used within the context of the animal receiving veterinary treatment or services Recline: As used in this disclosure, recline refers to a person who lies backward with the back supported. A person in such a position is said to be in a reclined position. Alternatively, recline may refer to a seat or chair wherein the back of the seat is in a sloped position such that a person sitting in the seat is in a reclined position. Such a seat or chair is often referred to as a reclining chair or a reclining seat.

Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Rounded: A used in this disclosure, the term rounded refers to the replacement of an apex, vertex, or edge or brink of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheet: As used in this disclosure, a sheet is a textile-based sheeting used to cover the mattress of a bed. A fitted sheet is a sheet that is further formed with seams and an optional elastic webbing such that the sheet is secured to the mattress without folding.

Sheeting: As used in this disclosure, a sheeting is a material, such as a paper, textile, a plastic, or a metal foil, in the form of a thin flexible layer or layers.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth.

Therapeutic: As used in this disclosure, therapeutic is an adjective that refers to a medical, ameliorative, or hygienic substance, process, or procedure.

Therapeutic Chair: As used in this disclosure, a therapeutic chair is a reclining furniture item that is intended for use with a patient. The angle at which the therapeutic chair reclines is often adjustable.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The two surfaces of a webbing with the greatest surface area are called the faces of the webbing.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A linen item comprising:
a reclining bed, a fitted sheet, and a friction strip;
wherein the friction strip attaches to the fitted sheet;
wherein the fitted sheet attaches to the reclining bed;
wherein the reclining bed further comprises a mattress;
wherein the reclining bed is adapted for use with a patient;
wherein the mattress is a cushion adapted for the patient to rest upon;
wherein the reclining bed forms a cant with a plane that is parallel to a supporting surface;
wherein the friction strip is a structure that is configured to prevent the patient from shifting position relative to the mattress when the patient rests on the fitted sheet;
wherein the fitted sheet encloses the mattress of the reclining bed;
wherein the fitted sheet forms a structure such that the fitted sheet attaches itself to the mattress;
wherein the form factor of the fitted sheet is selected to match the form factor of the mattress;
wherein the fitted sheet is a sheeting;
wherein the fitted sheet is formed from a textile;
wherein the fitted sheet comprises an exterior surface and, an interior surface;
wherein the exterior surface is the surface of the fitted sheet that is distal from the mattress when the fitted sheet is placed on the mattress;
wherein the interior surface is the surface of the fitted sheet that is proximal to the mattress when the fitted sheet is placed on the mattress;
wherein the interior surface is distal from the exterior surface;
wherein the friction strip forms a high friction surface;
wherein the friction strip is applied to the fitted sheet such that the friction strip is parallel to the width direction of the fitted sheet;
wherein the friction strip is located at a middle of the length direction of the fitted sheet, which is configured to interface with a buttocks of the patient;
wherein the buttocks of the patient are configured to rest upon the friction strip such that the friction strip is configured to hold the patient independently of the cant formed by the reclining bed.

2. The linen item according to claim 1 wherein the fitted sheet covers the mattress.

3. The linen item according to claim 2
wherein the reclining bed is a furniture item;
wherein the reclining bed forms a surface that is configured to support the patient at an elevation above the supporting surface;
wherein the reclining bed is an adjustable structure such that the cant is adjustable.

4. The linen item according to claim 3 wherein the reclining bed comprises a frame and a mattress;

wherein the frame creates an elevated surface that is configured to support the patient and the mattress at an elevation above the supporting surface;

wherein the mattress is further defined with a length direction and a width direction.

5. The linen item according to claim 4 wherein the frame is a mechanical structure;

wherein the frame forms a load path that is configured to transfer the load of the patient and the mattress to the supporting surface;

wherein the frame is an adjustable structure.

6. The linen item according to claim 5 wherein the construction of the frame is such that the cant of the elevated surface of the frame is adjustable;

wherein the construction of the frame is such that the cant of a segment of the elevated surface of the frame is adjustable;

wherein the segment is selected from the group consisting of: a) the entire elevated surface formed by the frame; and, b) a portion of the elevated surface formed by the frame.

7. The linen item according to claim 6 wherein the mattress rests on the elevated surface formed by the frame.

8. The linen item according to claim 7 wherein the mattress is a rectangular block structure;

wherein the length direction refers to the major axis of the rectangular block that forms the mattress when the mattress lays horizontally flat;

wherein the width direction refers to the minor axis of the rectangular block that forms the mattress that is parallel to the horizontal axis when the mattress lays horizontally flat.

9. The linen item according to claim 8 wherein the cant is the angle that is formed between the inferior surface of the mattress and a plane that is parallel to the supporting surface for the linen item.

10. The linen item according to claim 9 wherein the friction strip is a mechanical structure that attaches to the exterior surface of the fitted sheet.

11. The linen item according to claim 10 wherein the friction strip further comprises a friction coating;

wherein the friction coating is an elastomeric coating applied to the fitted sheet.

12. The linen item according to claim 11 wherein the friction coating forms the high friction surface.

* * * * *